(12) United States Patent
Perkins et al.

(10) Patent No.: US 8,375,017 B1
(45) Date of Patent: Feb. 12, 2013

(54) AUTOMATED KEYWORD ANALYSIS SYSTEM AND METHOD

(75) Inventors: William Michael Perkins, Columbus, OH (US); Bradley Dale Warnick, Powell, OH (US)

(73) Assignee: Manta Media, Inc., Columbus, OH (US)

( * ) Notice: Subject to any disclaimer, the term of this patent is extended or adjusted under 35 U.S.C. 154(b) by 1402 days.

(21) Appl. No.: 11/045,912

(22) Filed: Jan. 28, 2005

(51) Int. Cl.
*G06F 7/00* (2006.01)

(52) U.S. Cl. .......................... 707/706; 707/711; 707/715

(58) Field of Classification Search .................. 707/705, 707/706, 711, 715
See application file for complete search history.

(56) References Cited

U.S. PATENT DOCUMENTS

| | | | | |
|---|---|---|---|---|
| 5,873,107 | A * | 2/1999 | Borovoy et al. | 715/234 |
| 6,636,848 | B1 * | 10/2003 | Aridor et al. | 707/3 |
| 6,687,689 | B1 * | 2/2004 | Fung et al. | 707/3 |
| 6,915,507 | B1 * | 7/2005 | Kaler et al. | 717/103 |
| 7,028,024 | B1 * | 4/2006 | Kommers et al. | 707/3 |
| 7,054,860 | B2 * | 5/2006 | Inaba et al. | 707/5 |
| 7,200,640 | B1 * | 4/2007 | Cole et al. | 709/217 |
| 7,260,568 | B2 * | 8/2007 | Zhang et al. | 707/3 |
| 2002/0184159 | A1 | 12/2002 | Tadayon et al. | |
| 2003/0046389 | A1 * | 3/2003 | Thieme | 709/224 |
| 2004/0012631 | A1 | 1/2004 | Skorski | |
| 2004/0083127 | A1 * | 4/2004 | Lunsford et al. | 705/10 |
| 2005/0149862 | A1 | 7/2005 | Weitzman et al. | |
| 2005/0234879 | A1 * | 10/2005 | Zeng et al. | 707/3 |

* cited by examiner

*Primary Examiner* — Vincent Boccio
(74) *Attorney, Agent, or Firm* — Standley Law Group LLP

(57) ABSTRACT

An automatic keyword analysis for content illumination and document fragmentation for internet search queries. Initially, the invention obtains keywords from a document. The taxonomy then expands the obtained words from the document. The keywords are further refined using keyword demand data. The keyword demand data includes words where too few or too many searches would hamper the user's search. After refinement, the keyword final set is placed onto the appropriate web page. Consequently, internet search engines "hit" the web page because the automatic keyword analysis added optimal and efficient keywords.

17 Claims, 4 Drawing Sheets

AUTOMATED KEYWORD ANALYSIS SYSTEM AND METHOD

FIELD OF THE INVENTION

This invention relates generally to retrieving keywords in a document and more specifically, to an automated keyword analysis after retrieving keywords in a document to facilitate future search queries.

BACKGROUND OF THE INVENTION

For many people, using the World Wide Web ("web") has become a daily routine. However, with the increased amount of information on the World Wide Web locating the desired information has become challenging. Compounding the problem, the numbers of new users inexperienced at web searching are growing as well.

Search engines base the users interest on search terms or keywords entered in by the user. Once the user enters in the keywords, the search engine provides links to relevant subject matter on those entered keywords. Accordingly, the search engine accomplishes this by matching the keywords in the search query to a keyword index of web pages contained in the search engine's database. When the index includes the search keyword, the user's keywords are "hits" and the URL of the corresponding web page is returned to the user.

Unfortunately, this process for identifying web pages relevant to a search keyword is not an optimal process for finding all relevant matches. The keywords stored in the search engine's index are closely tied to the exact words appearing on the web page. Current search engine technology has limited ability to find pages with different but conceptually-related or synonymous keywords. For example, using an exact match process with the search term "automobile sales" will limit the search to "automobile" or "sales." However, numerous pages on the web may have used the terms "auto sales" or "car sales" to represent the same concept. In this case, the user will only find those pages that use the terms "automobile" and is thereby limited in his/her ability to find all information related to the subject matter.

Some attempts have been made to develop processes for identifying the important words and phrases to use in a web page's copy to enable users to find the page for a broader range of conceptually related or synonymous search terms. A taxonomy or thesaurus may be used to expand a web page's targeted set of keywords by identifying additional related words to include in the page's text. Moreover, a demand data analysis may be completed to refine the expanded keywords by determining which keywords users are most likely to enter in a search engine. Although attempts have been made, the processes are not fully automated or integrated. The current, non-automated process for identifying a complete set of relevant keywords to optimize and place on landing pages is labor intensive and consequently not feasible for large volumes of text.

As a result, there is a need for an automated process for analyzing documents to identify keywords for use in document landing pages. An automated keyword analysis process removes the labor involved in finding the keywords in a web-page or document, adding related keywords, refining the keywords, and placing them into the web page's or document's corresponding landing page. With an automated keyword analysis system and method, a user of a search engine has a higher probability of producing relevant "hits" on the web pages enhanced by the automated analysis. By automatically creating related subject matter keywords, use of the web is simplified and new users, as well as old users, can find the information they need on the ever expanding web.

SUMMARY OF THE INVENTION

In accordance with one embodiment of the present invention, an automated keyword analysis is disclosed. Accordingly, the invention parses a document or web page to retrieve the initial set of keywords or keyword starter set. A user may also enter keywords to indicate the content of the initial set of keywords. The automatic keyword analysis expands the initial set of keywords by using a taxonomy. The taxonomy adds keywords related to the subject matter of the initial set of keywords. The automatic keyword analysis then refines the expanded keyword set or keyword super set into a keyword final set. The keyword final set is placed in appropriate locations on the web page or document landing page. As a result of the expansion and refinement, the web page or document landing page contains keywords related to the subject matter of the keyword starter set for quick and efficient searching on the web.

The present invention is particularly well-suited for use with large documents such as articles, papers, reports, and newsletters that are available from an e-content publisher's web site. It may also be used in connection with a system and method for automatically generating document landing pages. One such system and method is described in U.S. patent application Ser. No. 11/046,054, entitled SYSTEM AND METHOD FOR GENERATING LANDING PAGES FOR CONTENT SECTIONS and filed Jan. 28, 2005. The foregoing and other objects, features, and advantages of the invention will be apparent from the following, more particular description of the exemplary embodiments of the invention, as illustrated in the accompanying drawing.

DETAILED DESCRIPTION OF EXAMPLE EMBODIMENTS

In referring to the Figures, an automatic keyword analysis will be described.

Figure 1:
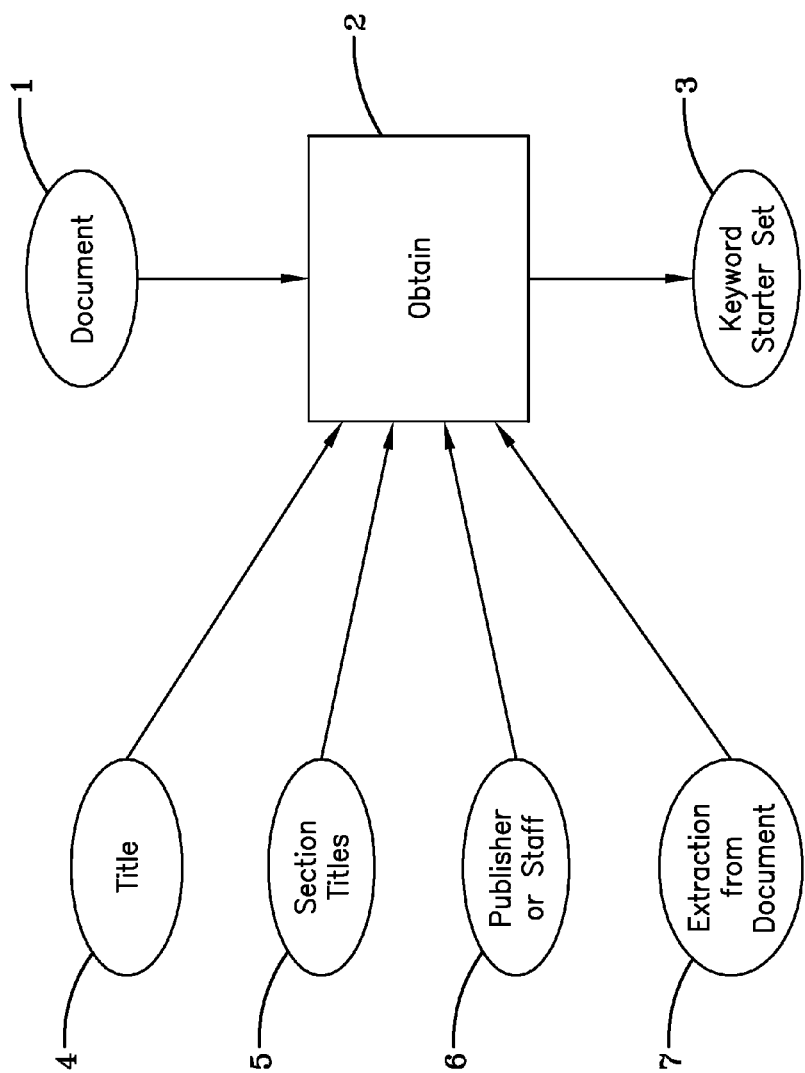
FIG. 1 is a functional diagram indicating the obtaining of keywords from a document.

Referring to FIG. 1, the first phase of the automatic keyword analysis is described. The first phase involves the obtaining 2 of a set of terms producing a keyword starter set 3. Initially, the user possesses a document 1. The keyword starter set is obtained 2 from the document 1 in a number of ways. Keywords found in the document title 4 may be one way of obtaining 2 the keyword starter set 3. Section titles 5 may also provide a keyword starter set 3. The automatic keyword analysis further provides a feature where the publisher or staff 6 manually introduce the keyword starter set 3. The publisher of the document 1 or staff member 6 chooses the keywords which best reflect the topic area related to the document.

Additional to the ways of obtaining 2 a keyword starter set 3 presented above, the automatic keyword analysis obtains 2 the keyword starter set 3 from the whole document 1. The automatic obtaining 2 takes a series of steps. First, the obtainer 2 identifies a plurality of entities within the document. In one embodiment, the identification of identities initially begins with a parser. The parser selects entities based on word size, location of the word in a sentence, commonality of the word, substantive value of the word, etc.

Second, after retrieving the plurality of entities, a frequency prominence analysis is applied to obtain 2 the keyword starter set 3. The frequency prominence analysis determines the number of times the word has been used. The greater the number of times the word has been used the more likely the word will be used 2 in the keyword starter set 3.

Figure 2:
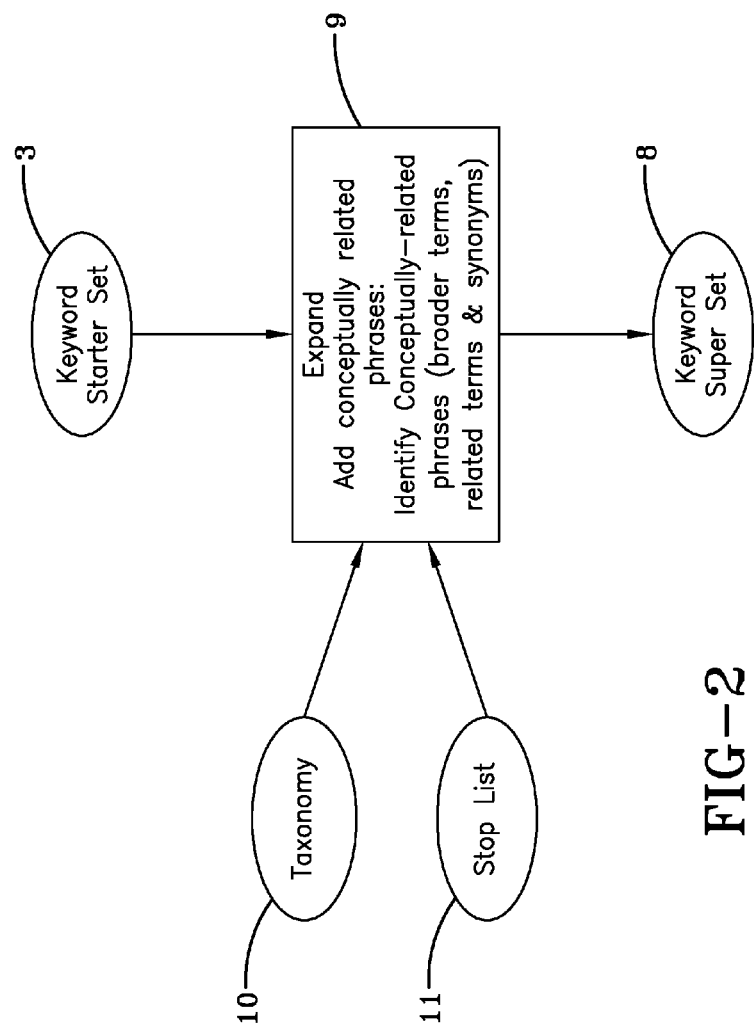
FIG. 2 is a functional diagram indicating the expansion of the obtained keywords.

Once the automatic keyword analysis retrieves the keyword starter set 3, the automatic keyword analysis provides several options for the user. One option determines whether the publisher of the document 1 wants to expand 9 the keyword starter set 3, which is shown in FIG. 2. The publisher of the document 1 may not want to expand 9 the keyword starter set because the publisher may feel additional keywords would hinder search queries from finding the page. Additionally, the publisher may have entered the keyword starter set 3 using the staff or publisher option 6 and therefore the keyword starter set 3 is sufficient. Therefore, a user may exclude the expansion 9 of the keyword starter set 3.

In another option, the user may select a batch processing mode. Batch processing processes large jobs which may take large amounts of computing time. By selecting the batch mode, the user processes jobs at a later time when there are fewer strains on the computer processor.

The automatic keyword analysis also includes a debugging option after each phase. The debugging options help the user and other personnel maintaining the system solve problems related to initial keyword obtaining 2, keyword expansion 9, and keyword refinement 12.

After obtaining 2 keywords forming the keyword starter set 3, FIG. 2 shows the next phase. The next phase includes the expansion 9 of the keyword starter set 3 into a keyword super set 8. Accordingly, the expansion 9 increases the number of keywords for a web page by adding in conceptually related phrases. In the embodiment depicted, a taxonomy 10 provides the conceptually related phrases. One commercially available taxonomy product that may be used to implement the present invention is Oracle® Thesaurus Management System from Oracle®. The taxonomy 10 includes broader terms which are related to a keyword in the keyword starter set 3. For example, if a keyword in the keyword starter set 3 contains "sedan," a broader term includes "automobile." The taxonomy 10 also includes related terms for expanding the keyword starter set 3 into a keyword super set 8. Expanding on the "sedan" hypothetical, "sports car" would also be added into the keyword super set 8 because of its relation to "sedan." The keyword starter set 3 may be expanded using a plurality of synonymous terms, which is included in a taxonomy 10. A synonymous term includes "car." As a result, the taxonomy 10 expands the keyword starter set 3 in a variety of different ways to form the keyword super set 8.

Although the taxonomy 10 expands the keyword starter set 3, the automatic keyword analysis excludes some keywords. Accordingly, the keywords pass through a stop list 11. The stop list 11 excludes keywords maintained by staff. The staff may exclude keywords because there is no substantive value or the keyword creates no additional benefit to the automatic keyword analysis.

Figure 3:
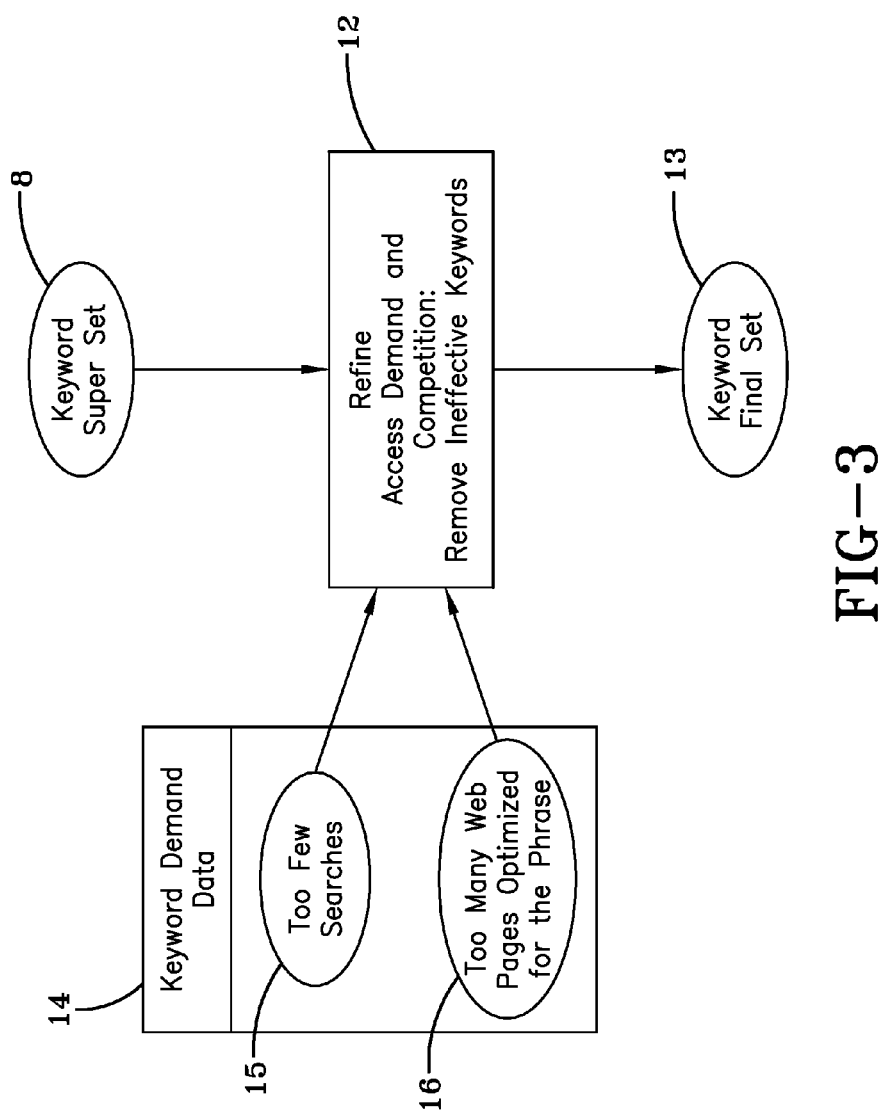
FIG. 3 is a functional diagram indicating the refinement of the expanded keywords.

Now referring to FIG. 3, the keyword super set 8 is further refined 12 into a keyword final set 13. Accordingly, not all keywords in the keyword super set 8 may be equally effective as "hits." Although a large number of keywords may be optimized for any specific document, typically the automatic keyword analysis focuses on keywords that are likely to yield the most traffic. For example, the phrase "motorcar sales" is synonymous with "automobile sales." However, very few people are likely to search for "motorcar sales." Consequently, in order to preserve limited optimization capability, the refiner may exclude the expanded word "motorcar sales."

The keyword starter set 3 may be refined in two ways. In one embodiment, a keyword from the keyword starter 3 is removed because of the refinement. In the other embodiment, if one actually used the word "motorcar sales" in the keyword starter set 3, the refiner includes that keyword.

The refining 12 of the keyword superset 8 may be based on keyword demand data 14. The keyword demand data 14 may be used to determine whether it is desirable to use a relevant keyword. There are two reasons for exclusion of keywords, reflected in the keyword demand data 14, from the keyword super set 8. First, there are too few searches in an internet search engine for the phrase 15 indicating it is unlikely to be entered in a search engine by web users. Second, there are too many web pages that are optimized for that phrase 16 thereby making it difficult to achieve high rankings in a search. As a result, the keyword demand data 14 optimizes the automatic keyword analysis by excluding keywords in the keyword super set 8.

Figure 4:
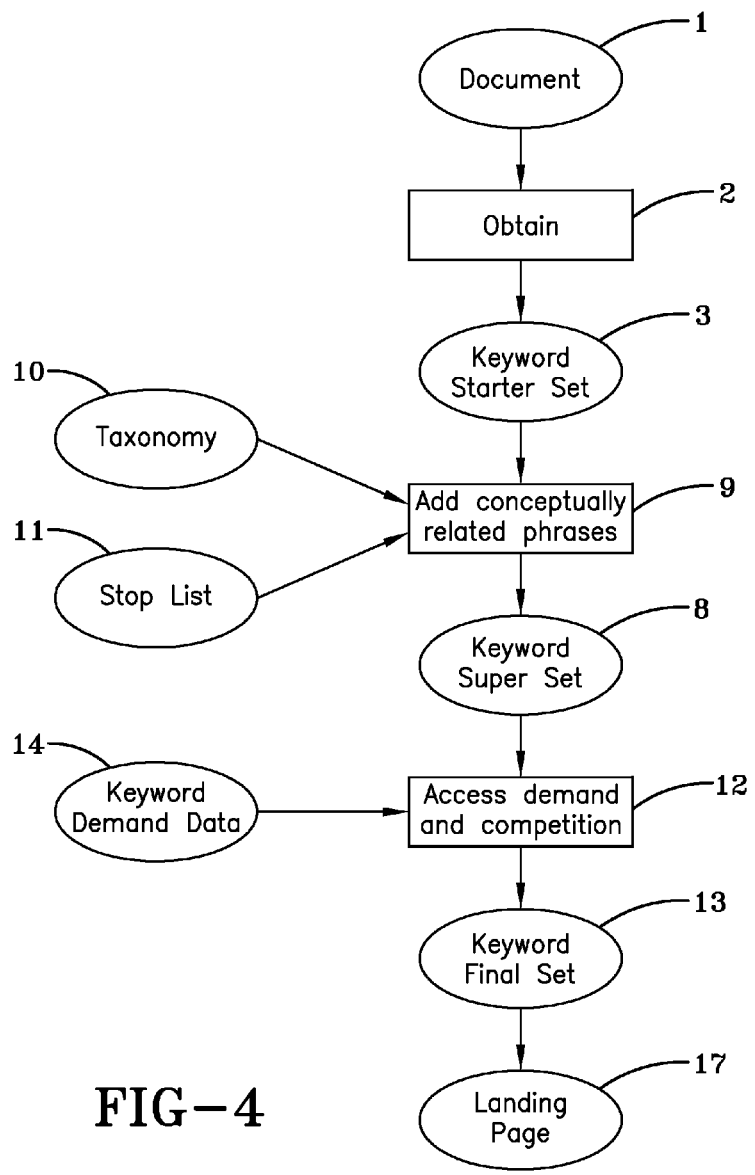
FIG. 4 is a functional diagram indicating the placement of the refined keywords onto a web page.

Consequently, the automatic keyword analysis produces a keyword final set 13. As shown in FIG. 4, the final keyword set 13 includes keywords obtained 2 from a document 1, expanded 9 by a taxonomy and reduced by a stop list 11, and refined 12 by keyword demand data 14. The final phase for the automatic keyword analysis places the keyword final set 13 onto a web page 17. Therefore, an internet search query easily locates the web page for relevant keywords despite the amount of information on the web. Moreover, inexperienced web searchers receive documents on the web without the exact matching of a keyword.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computerized method of automatically identifying keywords relevant to a document invisible to search engines comprising:

analyzing at a computer the document invisible to search engine crawlers to obtain a keyword starter set from the document, the keyword starter set obtained by:

(1) applying at said computer an automated parser to the document to obtain keywords; and (2) applying a frequency prominence analysis to the keywords to select one or more frequently occurring keywords to add to the keyword starter set;

expanding at the computer the keyword starter set by applying a computerized taxonomy to the keyword starter set to form a keyword super set;

applying at the computer a keyword stop list to keywords in the keyword super set to remove keywords included in the keyword stop list;

refining at the computer the keyword super set to form a keyword final set by applying keyword demand data to the keyword super set to remove one or more additional keywords from the keyword super set, wherein the demand data reflects the frequency of use of the keywords as search terms in internet search engines;

adding at the computer the keyword final set to a web page for accessing the document;
storing the document invisible to search engines for retrieval via the web page for accessing the document;
adding the web page with the keyword final set to a web site to facilitate location by internet search engines of the web page for accessing the document according to the keywords added to the web page; and
providing internet users with access via the web page to the document invisible to search engines.

2. The method of claim 1, wherein the keyword starter set comprises a plurality of keywords in a document title of the document.

3. The method of claim 1, wherein the keyword starter set comprises a plurality of keywords in a section title of the document.

4. The method of claim 1, wherein the keyword starter set comprises a plurality of user provided words.

5. The method of claim 1 wherein obtaining a keyword starter set from the document comprises selecting a batch processor for batch processing the document to produce a keyword starter set.

6. The method of claim 1 further comprising storing the keyword starter set for debugging purposes.

7. The method of claim 1, wherein expanding the keyword starter set by applying a computerized taxonomy comprises adding a plurality of related keywords.

8. The method of claim 1, wherein the keyword stop list comprises a maintained list of keywords.

9. The method of claim 1 further comprising storing the keyword super set for debugging purposes.

10. The method of claim 1, wherein refining the keyword super set to form the keyword final set by applying keyword demand data that reflects the frequency of use of the keywords as search terms in internet search engines further comprises:
removing the search keyword from the keyword super set if the number of successful searches indicated by the keyword demand data is low; and
removing the search keyword from the keyword super set if the number of web pages relevant to the keyword as indicated by the keyword demand data is high.

11. A system for identifying keywords relevant to a search query to add to a web page for accessing a document invisible to search engines comprising:
a server connected to a network, the server uploading a document from a user via the network, the server comprising:
at least one processor;
a database storing a plurality of documents invisible to search engines; and
a memory operatively coupled to the processor, the memory storing program instructions that when executed by the processor, cause the processor to:
generate a keyword starter set from the document invisible to search engines, the keyword starter set generated by:
(1) applying a parser to the document to obtain keywords; and
(2) applying a frequency prominence analysis to the keywords to select frequently occurring keywords to add to the keyword starter set,
add a plurality of related keywords to the keyword starter set by applying a taxonomy to the keyword starter set,
form a keyword super set by eliminating a plurality of stop keywords from the keyword starter set and the plurality of related keywords,
use keyword demand data to remove one or more keywords from the keyword super set to form a keyword final set wherein the demand data indicates the frequency of use of the keywords as search terms in internet search engines,
add the keyword final set to a web page for accessing the document;
store the document in the database of documents invisible to search engines;
add the web page to a web site to facilitate internet search engines indexing of the web page for accessing the document according to the keywords added to the web page; and
provide internet users with access via the web page to the document invisible to search engines.

12. The system of claim 11, wherein the server uses keyword demand data to remove one or more keywords from the keyword super set to form a keyword final set by:
removing the search keyword from the keyword super set if the number of successful searches indicated by the keyword demand data is low; and
removing the search keyword from the keyword super set if the number of web pages relevant to the keyword as indicated by the keyword demand data is high.

13. A computerized method of identifying keywords relevant to a search query to facilitate search engine location of a web page for accessing a document invisible to search engines comprising:
obtaining at a computer a keyword starter set from the document invisible to search engines;
applying at said computer a computerized taxonomy to the keyword starter set to form a keyword super set by expanding the keyword starter set to include additional words conceptually related to the keywords in the starter set;
applying at the computer keyword demand data to the keyword super set to remove one or more words from the keyword super set to create a keyword final set, wherein the demand data reflects the frequency of use of the words as search terms in internet search engines;
adding at the computer the keyword final set to a web page for accessing the document;
storing the document invisible to search engines for retrieval via the web page for accessing the document;
adding the web page to a web site to facilitate location by internet search engines of the web page for accessing the document according to the keywords from the keyword final set; and
providing internet users with access via the web page to the document invisible to search engines.

14. The method of claim 13 wherein the keyword starter set is obtained by using words from the document title.

15. The method of claim 13 wherein the keyword starter set is obtained by using words from the document title and the section titles of the document.

16. The method of claim 13 wherein the keyword starter set is obtained from a computer user manually entering the keywords in a computer.

17. The method of claim 13 wherein the keyword starter set is obtained automatically by:
a. applying a parser to the document to select keywords based on the word size, location of the word in a sentence, and commonality of the word in the document;
b. applying a frequency prominence analysis to the keywords identified in step (a) to select words that occur frequently in the document.

* * * * *